(12) United States Patent
Kusuda et al.

(10) Patent No.: US 8,279,188 B2
(45) Date of Patent: Oct. 2, 2012

(54) PROTECTIVE PANEL HAVING TOUCH PANEL FUNCTION

(75) Inventors: Yasuji Kusuda, Kyoto (JP); Takao Hashimoto, Kyoto (JP); Toshiyuki Iwai, Kyoto (JP); Koji Okamoto, Kyoto (JP); Jun Shimizu, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 746 days.

(21) Appl. No.: 12/521,922

(22) PCT Filed: Dec. 18, 2007

(86) PCT No.: PCT/JP2007/074292
§ 371 (c)(1),
(2), (4) Date: Jul. 1, 2009

(87) PCT Pub. No.: WO2008/081710
PCT Pub. Date: Jul. 10, 2008

(65) Prior Publication Data
US 2010/0033442 A1   Feb. 11, 2010

(30) Foreign Application Priority Data

Jan. 4, 2007 (JP) .................................. 2007-000069

(51) Int. Cl.
*G06F 3/041* (2006.01)
(52) U.S. Cl. ................... 345/173; 178/18.01; 178/18.05; 178/18.06; 178/18.07; 200/600; 349/58; 361/600; 345/174
(58) Field of Classification Search .......... 345/173–178; 178/18.01–18.11; 200/600, 512, 310, 313.317, 200/317; 349/58; 361/600
See application file for complete search history.

(56) References Cited

U.S. PATENT DOCUMENTS
6,243,259 B1 * 6/2001 Yamakawa et al. ...... 361/679.24
(Continued)

FOREIGN PATENT DOCUMENTS
JP        63-26631       2/1988
(Continued)

OTHER PUBLICATIONS

International Search Report issued Apr. 1, 2008 in the International (PCT) Application of which the present application is the U.S. National Stage.
Patent Cooperation Treaty (PCT) International Preliminary Report on Patentability issued Apr. 1, 2008 in International Application No. PCT/JP2007/074292.
(Continued)

*Primary Examiner* — Lun-Yi Lao
*Assistant Examiner* — Sosina Abebe
(74) *Attorney, Agent, or Firm* — Wenderoth, Lind & Ponack, LLP

(57) ABSTRACT

A protective panel having touch panel function is used for protecting a front surface of a display device that is disposed so as to be visually recognized from outside, and the protective panel is fitted in a panel fitting part of a casing provided with an opening such that an outer surface of the protective panel forms a flat plane identical with that of the casing with no gap formed therebetween. The protective panel includes: an upper electrode sheet having a decorative layer and upper electrodes provided thereon; and a lower electrode sheet having lower electrodes provided on an upper surface thereof, and the upper electrode sheet and the lower electrode sheet are disposed such that the respective electrodes thereof face with each other. On a lower surface of the upper electrode sheet, at a non-electrode part not provided with the upper electrodes, there is provided a height difference adjustment part that has a thickness substantially equal to each of those of the upper electrodes, and the height difference adjustment part is provided such that short circuit is prevented with the upper electrodes as well as with the lower electrodes.

12 Claims, 9 Drawing Sheets

U.S. PATENT DOCUMENTS

| | | | |
|---|---|---|---|
| 6,483,498 B1 * | 11/2002 | Colgan et al. | 345/173 |
| 6,707,450 B2 * | 3/2004 | Ahn et al. | 345/173 |
| 7,161,639 B2 * | 1/2007 | Nishiyama et al. | 349/12 |
| 7,517,567 B2 * | 4/2009 | Masuda et al. | 428/1.5 |
| 7,920,225 B2 * | 4/2011 | Nishikawa et al. | 349/60 |
| 2001/0005200 A1 * | 6/2001 | Suzuki | 345/173 |
| 2001/0038493 A1 * | 11/2001 | Watanabe | 359/609 |
| 2004/0041796 A1 * | 3/2004 | Lee | 345/173 |
| 2005/0099402 A1 * | 5/2005 | Nakanishi et al. | 345/173 |
| 2005/0110772 A1 * | 5/2005 | Kong et al. | 345/174 |
| 2007/0181456 A1 * | 8/2007 | Kusuda et al. | 206/443 |
| 2008/0218951 A1 * | 9/2008 | Kusuda | 361/681 |

FOREIGN PATENT DOCUMENTS

| | | |
|---|---|---|
| JP | 2000-270063 | 9/2000 |
| JP | 2001-318612 | 11/2001 |
| JP | 2004-240963 | 8/2004 |
| WO | 2005/064451 | 7/2005 |

* cited by examiner

PROTECTIVE PANEL HAVING TOUCH PANEL FUNCTION

TECHNICAL FIELD

The present invention relates to a protective panel that protects a display screen of a mobile phone, a PDA, or the like, and that functions as a touch panel to accept inputs.

BACKGROUND ART

An ordinary casing of an electronic device such as a mobile phone or a smartphone is formed into a flat shape by combining a front casing with a rear casing that are each made of a synthetic resin. More specifically, there is fixed onto a front surface of the front casing by fusion bonding or the like a protective panel that protects a liquid crystal display window. Conventionally employed as the protective panel had been a transparent and colorless resin panel. However, as disclosed in Japanese Unexamined Patent Publication No. 2001-318612, such a panel is now decorated with a printed frame or the like in accordance with the desire for a more fashionable electronic device.

In recent years, a mobile phone of a next interface has been expected to have the protective panel that also functions as an input device. Such a function as an input device may be realized by an analog resistive touch panel, and a mobile phone provided with a touch panel is exemplarily disclosed in Japanese Unexamined Patent Publication No. 2000-270063 and the like.

Patent Document 1: Japanese Unexamined Patent Publication No. 2000-270063
Patent Document 2: Japanese Unexamined Patent Publication No. 2001-318612

DISCLOSURE OF INVENTION

Issues to be Solved by the Invention

In a protective panel having an analog resistive touch panel functioning as an input device, a flexible upper electrode sheet and a rigid lower electrode sheet are disposed in this order from the side to view the panel and are laminated with each other. For example, the upper electrode sheet may include a hard coating sheet, a decorative sheet, and an upper electrode, which are laminated with one another. The lower electrode sheet may include a lower electrode and a plastic support plate which are laminated with each other.

A protective panel having a touch panel may be differently configured by an upper electrode sheet that is provided with a first sheet having a front surface applied with hard coating and a rear surface printed with a decorative layer and a second sheet having an upper electrode, which are laminated and bonded to each other.

In any of the above configurations, the upper electrode sheet is provided with the decorative layer on the front surface and the upper electrode on the rear surface. FIG. 6A is a schematic view showing an example of arrangement and configuration of the upper electrode that is provided on the rear surface of the upper electrode sheet in the conventional protective panel having a touch panel. FIG. 6B is a schematic view showing an example of arrangement and configuration of the lower electrode that is provided on the front surface of the lower electrode sheet in the conventional protective panel having a touch panel. Exemplarily Described below is the upper electrode sheet with reference to FIG. 6A. An upper electrode sheet 100 is so constructed that an upper electrode 102 is provided on a front surface of a flexible sheet 101. The upper electrode 102 has a transparent electrode 103 that is provided on a rear surface of an input screen of the touch panel, a pair of bus bars 104 that are provided in parallel with each other on upper and lower or left and right ends (on the upper and lower ends in the figure) of the transparent electrode 103, and routing circuits that provide communication respectively from the bus bars 104 to output terminals 105. As shown in FIG. 6B, in a lower electrode sheet 110, bus bars 114 and routing circuits 116 are each provided on an end of a transparent electrode 113.

An analog resistive touch panel is operative based on the following principle. When the transparent electrode 103 of the upper electrode sheet 100 is partially pressed toward the lower electrode sheet 110, the transparent electrode 103 of the upper electrode sheet 100 and the transparent electrode 113 of the lower electrode sheet 110 are brought into contact with each other. The position of contact between the transparent electrodes 103 and 113 is specified by measuring a resistance of a current that flows between the terminals 105 and terminals 115 respectively by way of the bus bars 104 and 114 as well as the routing circuits 106 and 116.

The transparent electrodes 103 and 113, the bus bars 104 and 115, and the routing circuits 106 and 116 of the upper electrode sheet and the lower electrode sheet need to be respectively exposed on the front surfaces of the upper electrode sheet 100 and the lower electrode sheet 110. As these electrodes are each provided by forming a metal thin film on a surface of a film by vacuum vapor deposition, sputtering, ion plating, CVD, roll coating, or the like, there is generated a difference in height on the surface of the film.

The upper electrode sheet is flexible and relatively thin. There is thus formed such a difference in height in a region provided with the upper electrode and the difference affects even the front surface of the upper electrode sheet. Accordingly generated is a difference in height (hereinafter, abbreviated as a surface difference) between the region provided with the upper electrode and the remaining region not provided therewith when seen from the front surface of the upper electrode sheet. This difference deteriorates flatness as well as appearance of the decorative layer. Particularly in a case where the decorative layer on the upper electrode sheet has metallic luster, the underneath surface difference stands out to the front surface of the protective panel, which results in affecting more significantly on appearance thereof.

Therefore, the technical issue to be solved by the present invention is to provide a protective panel having touch panel function and prevents a surface difference from standing out to a front surface thereof.

Means for Solving the Issues

In order to solve the above technical issue, the present invention provides a protective panel having touch panel function in accordance with the following configurations.

According to a first aspect of the present invention, there is provided a protective panel having touch panel function, the protective panel being used for protecting a front surface of a display device that is disposed so as to be visually recognized from outside, and the protective panel being fitted in a panel fitting part of a casing provided with an opening such that an outer surface of the protective panel forms a flat plane identical with that of the casing with no gap formed therebetween, the protective panel comprising: an upper electrode sheet having an upper electrode provided on a lower surface thereof and a decorative layer provided to hide the upper electrode; and a lower electrode sheet having a lower electrode provided on an upper surface thereof, the upper electrode sheet and the lower electrode sheet being disposed such that the respective electrodes thereof face with each other, the protective panel characterized by comprising, on the lower surface of the upper electrode sheet, at a non-electrode part not provided with the upper electrode, a height difference adjustment part having a thickness substantially equal to that of the upper electrode, with a nonconductive part interposed between the height difference adjustment part and each of the upper electrode and the lower electrode so as to prevent short circuit therebetween.

According to a second aspect of the present invention, there is provided the protective panel having touch panel function according to the first aspect, characterized in that the height difference adjustment part is made of a material same as that for the upper electrode.

According to a third aspect of the present invention, there is provided the protective panel having touch panel function according to the first aspect, characterized in that the height difference adjustment part is provided as a solid pattern to cover the non-electrode part on the lower surface.

According to a fourth aspect of the present invention, there is provided the protective panel having touch panel function according to the first aspect, characterized in that the height difference adjustment part is provided as a pattern of dots that are distributed to be gradually sparser toward an edge of the protective panel.

According to a fifth aspect of the present invention, there is provided the protective panel having touch panel function according to the first aspect, characterized in that the decorative layer has metallic luster.

According to a sixth aspect of the present invention, there is provided the protective panel having touch panel function according to first aspect, characterized in that the height difference adjustment part is provided in 70 to 95% of an area of the non-electrode part.

According to a seventh aspect of the present invention, there is provided the protective panel having touch panel function according to the first aspect, characterized in that the upper electrode sheet and the lower electrode sheet are bonded to each other using an adhesive layer that is provided on peripheries thereof, and the adhesive layer is provided at a portion provided with the height difference adjustment part.

According to an eighth aspect of the present invention, there is provided the protective panel having touch panel function according to the first aspect, characterized in that the height difference adjustment part and the upper electrode are configured by metal layers that are formed on the upper electrode sheet simultaneously with each other in a print process.

According to a ninth aspect of the present invention, there is provided the protective panel having touch panel function according to the first aspect, characterized in that the nonconductive part is provided as an air space between the upper electrode and the height difference adjustment part that are spaced apart from each other.

According to a 10th aspect of the present invention, there is provided the protective panel having touch panel function according to the ninth aspect, characterized in that the adhesive layer is provided so as not to be in contact with the air space.

According to an 11th aspect of the present invention, there is provided the protective panel having touch panel function according to the first aspect, characterized in that the nonconductive part is provided as a resist layer on a front surface between the upper electrode and the height difference adjustment part.

According to a 12th aspect of the present invention, there is provided the protective panel having touch panel function according to the first aspect, characterized by comprising on the upper surface of the lower electrode sheet, at a non-electrode part not provided the lower electrode, a lower height difference adjustment part having a thickness substantially equal to that of the lower electrode, with a nonconductive part interposed between the lower height difference adjustment part and each of the upper electrode and the lower electrode so as to prevent short circuit therebetween.

Effects of the Invention

According to the first aspect of the present invention, in circuit formation on the upper electrode sheet, the non-electrode part is provided with the height difference adjustment part that has the thickness substantially equal to that of the upper electrode, so that surface difference generated by existence and nonexistence of the upper electrode become harder to be visually recognized. Accordingly, when the protective panel having touch panel function is seen from the front surface thereof, flatness as well as appearance of the decorative layer are improved with no influence by the underneath surface difference.

According to the second aspect of the present invention, as the height difference adjustment part is made of the material same as that for the upper electrode, the portion provided with the height difference adjustment part and the portion provided with the upper electrode are similarly affected by the respective surface differences. As a result, the surface difference of the upper electrode is substantially equal to the surface difference of the height difference adjustment part, so that the surface differences appearing on the front surface of the protective panel are hard to be visually recognized as a whole.

According to the third aspect of the present invention, as the height difference adjustment part is provided as the solid pattern, the portion provided with the height difference adjustment part is less affected by the surface difference as a whole.

According to the fourth aspect of the present invention, in a case where the height difference adjustment part is provided on the upper electrode sheet having the non-electrode part in a large area, formation of the height difference adjustment part on the entire wiring regions will cause increase in cost. When the height difference adjustment part is provided as the pattern of dots that are distributed to be gradationally sparser toward the edge of the protective panel, gradually reduced is the influence by the surface difference, resulting in improvement in flatness as well as appearance of the decorative layer.

According to the fifth aspect of the present invention, when the decorative layer has metallic luster, reflection of light on the front surface of the decorative layer increases the influence on appearance of the decorative layer. Thus, in a case where there is a surface difference, such a difference is easy to be visually recognized and largely affects appearance of the decorative layer. By applying the configuration according to the present invention to the decorative layer with metallic luster, more significantly obtained is the effect that the surface difference is hard do be visually recognized.

According to the sixth aspect of the present invention, the height difference adjustment part is formed preferably in a large area of the non-electrode part so that the surface difference becomes hard to be visually recognized. However, the height difference adjustment part needs to be formed while being spaced apart from the upper electrode so as to prevent short circuit with the upper electrode. Accordingly, when the height difference adjustment part is provided in 70 to 95% of the surface area of the non-electrode part, appearance will not be affected by the surface difference while short circuit with the upper electrode being effectively prevented.

According to the seventh aspect of the present invention, when the adhesive layer is arranged on the portion provided with the height difference adjustment part, effectively prevented can be short circuit between the height difference adjustment part and the lower electrode.

According to the eighth aspect of the present invention, when the height difference adjustment part and the upper electrode are provided as the metal layers that are applied thereto simultaneously with each other in the print process, the both parts can be fabricated in one process, which results in reduction in workload for production.

According to the ninth aspect of the present invention, when the nonconductive part is provided as the air space that is formed by a gap, prevented in such a simple configuration can be short circuit between the upper electrode and the height difference adjustment part.

According to the eleventh aspect of the present invention, when the nonconductive part is provided as the resist layer, securely prevented is short circuit between the lower electrode and the height difference adjustment part.

According to the twelfth aspect of the present invention, since the difference in height in the lower electrode sheet also affects the upper electrode sheet, provision of the lower height difference adjustment part to each of the lower electrode sheet and the upper electrode sheet can prevent the differences in height in the respective electrode sheets from affecting the upper electrode sheet.

BRIEF DESCRIPTION OF DRAWINGS

These and other aspects and features of the present invention will become clear from the following description taken in conjunction with the preferred embodiments thereof with reference to the accompanying drawings, in which.

BEST MODE FOR CARRYING OUT THE INVENTION

Described below with reference to the drawings is a protective panel for a display of a mobile phone according to one embodiment of the present invention.

Firstly described are meanings of terms to be used in the present invention. In the present invention, an upper electrode is referred to as a generic name of an electrode that is provided on an upper electrode sheet and secures electric connection with an upper transparent electrode. In the embodiment to be described below, the upper electrode includes routing circuits, bus bars, and output terminals. On the other hand, a lower electrode is a generic name of an electrode that is provided on a lower electrode sheet and provides electric connection with a transparent electrode. In the embodiment to be described below, the lower electrode includes routing circuits, bus bars, and output terminals.

Figure 1:
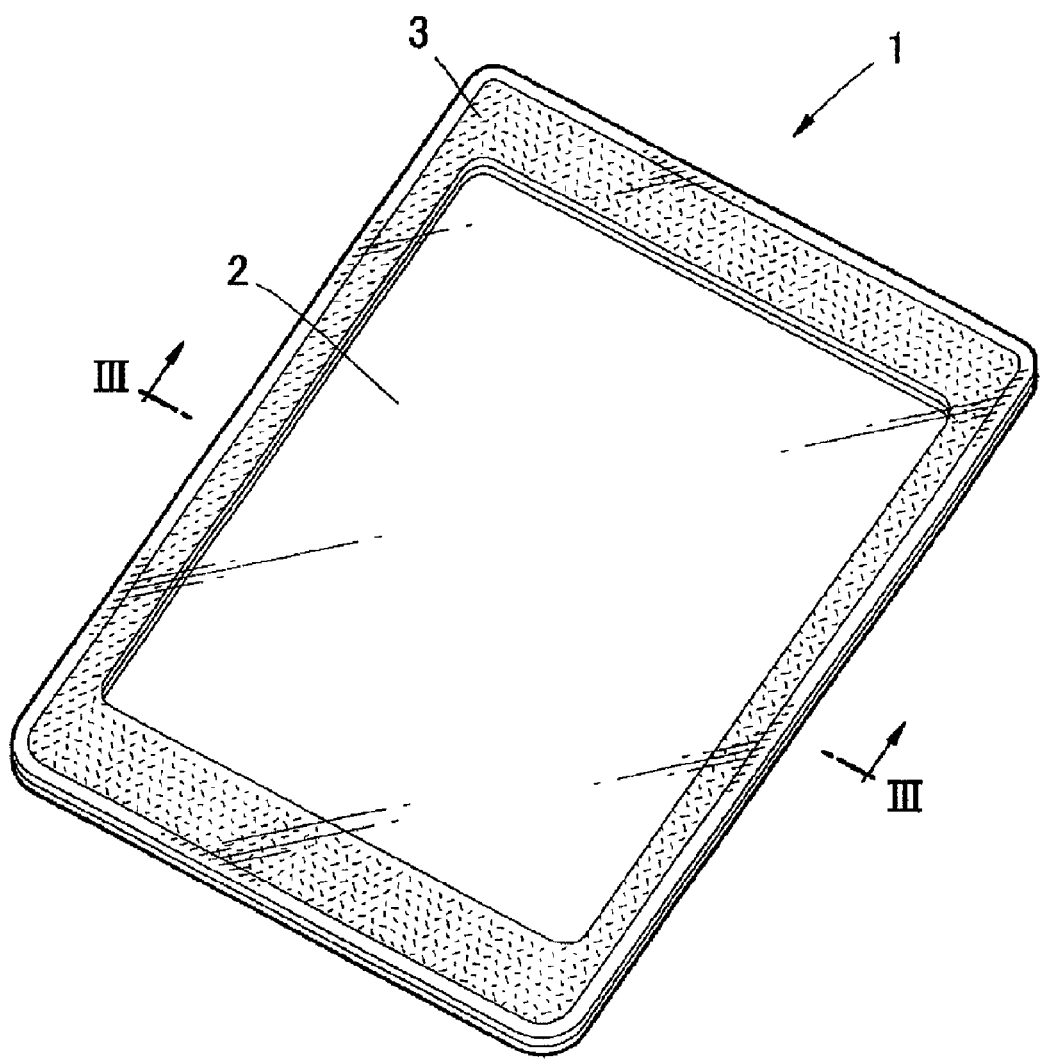
FIG. 1 is a schematic perspective view showing an external configuration of a protective panel for a display of a mobile phone according to an embodiment of the present invention.

FIG. 1 is a schematic perspective view showing an external configuration of a protective panel for a display of a mobile phone according to one embodiment of the present invention. A protective panel 1 is used for protecting a front surface of a liquid crystal display or an organic EL display of a mobile phone, and is made of a plastic into a thin plate shape. There is provided a window part 2 in the center of the protective panel 1. The window part 2 is made transparent to see therethrough a screen of the display. Provided on the periphery of the window part 2 is a colored decorative region 3 that hides electrodes of a touch panel to be described later.

The decorative region is not particularly limited in design or in pattern as long as the decorative region is capable of hiding the electrodes provided on the periphery of the window part 2. For example, the decorative region may be configured by a colored pattern in a metallic luster color.

Figure 2A:
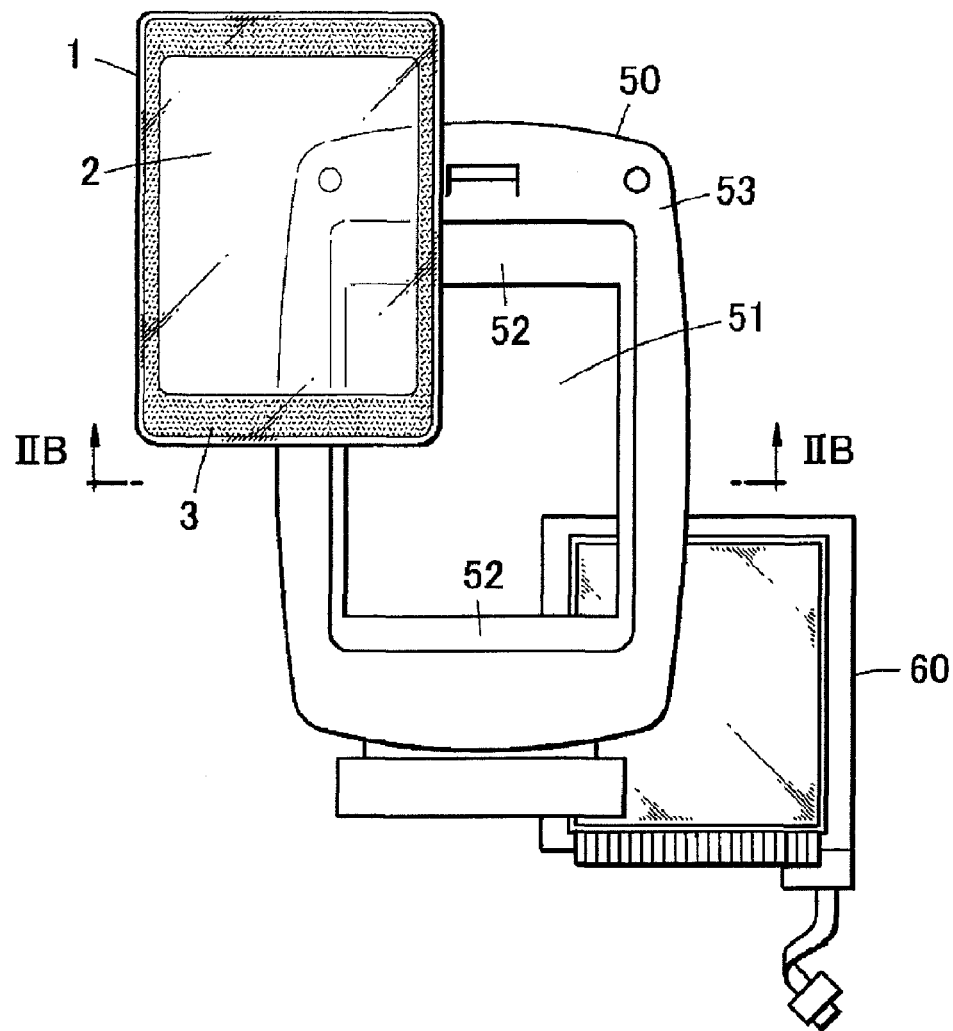
FIG. 2A is an exploded perspective view showing a mount structure according to a working example for a front casing that employs the protective panel of FIG. 1.
Figure 2B:
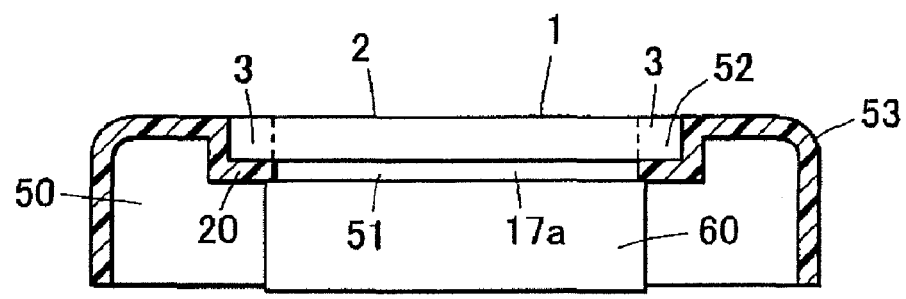
FIG. 2B is a cross sectional view taken along a line IIB-IIB in FIG. 2A.

As shown in FIGS. 2A and 2B, the protective panel 1 is fitted into an opening 51 of a front casing 50 of the mobile phone. The front casing 50 is provided with a concave part 52 that allows the protective panel 1 to be fitted thereinto. The concave part 52 preferably has a depth substantially equal to the thickness of the protective panel 1. The opening 51 is formed on the bottom surface of the concave part 52, and the decorative region 3 of the protective panel 1 is supported by the peripheral edge of the bottom surface.

There is disposed a display device 60 in the opening 51. As shown in FIG. 2B, the casing 50 supports only the peripheral edge of the protective panel 1, so that the protective panel 1 is allowed to have a touch input operation screen of a size substantially equal to that of the opening 51. The touch input operation screen can thus be formed in most of a visual area of the display that can be seen from outside the casing 50. As apparent from FIG. 2B, there is no difference in height between a front surface 53 of the casing and the touch input operation screen, so that sliding operations are evenly performed on the touch input operation screen, resulting in less deterioration in touch input function. Moreover, no difference in height described above allows dirt of fats and oils or the like adhering to the touch input operation screen upon input operations to be easily wiped off, as well as allows the thickness of the device to be reduced.

Further, as shown in FIG. 2B, when the protective panel 1 is fitted from outside the front casing 50 to be retained by the concave part 52, the protective panel 1 is not brought into direct contact with the display 60 but there is provided a gap from the display correspondingly to the thickness of the bottom wall of the concave part 52 in the front casing 50. Even upon application of an external force from outside the protective panel 1, such an external force does not work directly onto the front surface of the display 60, thereby preventing damages to the display.

Figure 3:
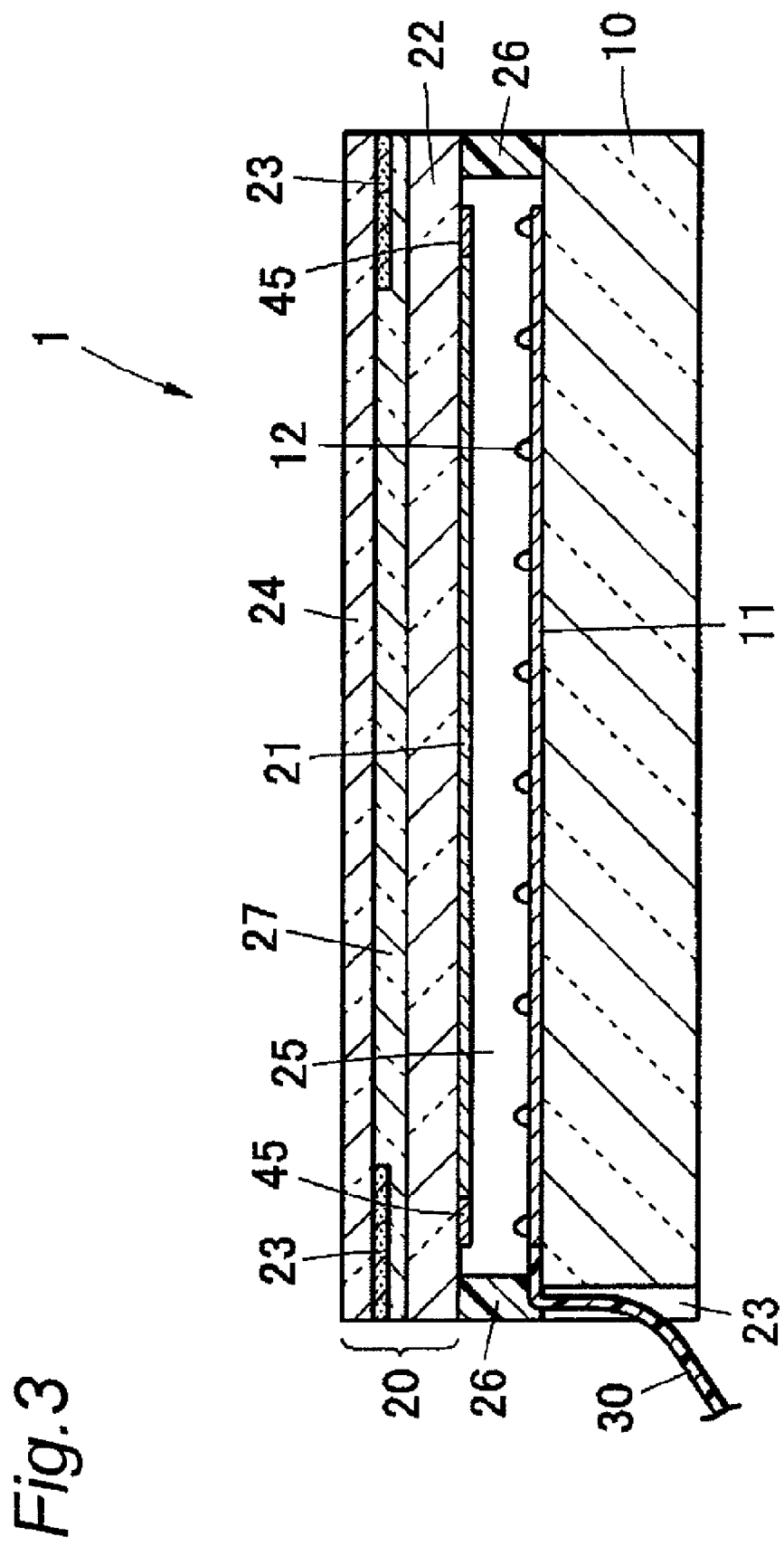
FIG. 3 is a cross sectional view of the protective panel taken along line III-III in FIG. 1.

FIG. 3 is a cross sectional view of the protective panel taken along a line III-III in FIG. 1. The protective panel 1 for a display window of an electronic device includes a protective panel body 10 and a movable electrode film 20. The protective panel body 10 and the movable electrode film 20 are bonded to each other with use of a double-sided adhesive tape 26 on peripheral edges thereof with an air space 25 formed between electrodes. The protective panel body 10 corresponds to a lower electrode sheet, while the movable electrode film corresponds to an upper electrode sheet.

The protective panel body 10 and the movable electrode film 20 are each provided with bus bars and routing circuits (refer to FIGS. 4A and 4B) and the like of running lines in a predetermined pattern on the same surface of a lower transparent electrode 11 or an upper transparent electrode 21, and outputs are led to the outside by a film connector 30. Provided between the protective panel body 10 and the movable electrode film are spacers 12 that prevent erroneous contact between the electrodes 11 and 21 provided respectively on the opposing surfaces.

The spacers 12 can be each obtained by forming a transparent photo-curable resin into a minute dot shape in the photoprocess. The spacers 12 can be alternatively obtained by forming a large number of minute dots in the print process.

The protective panel body 10 is made of a material that has excellent see-through performance and is capable of protecting against damages the display 60 such as a liquid crystal panel or an organic EL panel. Examples of the above material include general-purpose resins such as polystyrene series resin, polyolefin series resin, ABS resin, AS resin, acrylic series resin, and AN resin. Alternatively, used as the material may be general-purpose engineering resins such as polyphenylene oxide polystyrene series resin, polycarbonate series resin, polyacetal series resin, polycarbonate modified polyphenylene ether resin, polybutylene terephthalate resin, or ultrahigh molecular weight polyethylene resin; or super engineering resins such as polysulfone resin, polyphenylene sulfide series resin, polyphenylene oxide series resin, polyarylate resin, polyetherimide resin, polyimide resin, liquid crystalline polyester resin, or polyallyl series high-temperature resin.

With reference to FIG. 3, the protective panel body 10 is provided on the upper surface thereof with the lower transparent electrode 11 and electrodes. The lower transparent electrode 11 is provided directly onto the surface of the protective panel body 10. Alternatively, the lower transparent electrode 11 may be formed by bonding onto the surface thereof a transparent film that is provided with a transparent electrode. The transparent resin film in this case can be made of an engineering plastic of polycarbonate series, polyamide series, polyether ketone series, or the like, or a resin film of acrylic series, polyethylene terephthalate series, polybutylene terephthalate series, or the like.

The movable electrode film 20 is formed by bonding a transparent resin cover film 24 onto an upper surface of a transparent resin film 22 with use of a transparent adhesive agent 27. The transparent resin film 22 is provided on a lower surface thereof with the upper transparent electrode 21 and routing circuits. The transparent resin cover film 24 is provided at least on one of surfaces thereof with a decorative layer 23 that has a transparent window part.

The transparent resin film 22 can be made of an engineering plastic of polycarbonate series, polyamide series, polyether ketone series, or the like, or a resin film of acrylic series, polyethylene terephthalate series, polybutylene terephthalate series, or the like. It is noted that a conductive coating sheet may be left unremoved as long as it does not function as an electrode.

The lower transparent electrode 11 and the upper transparent electrode 21 are each made of a transparent conductive film. Examples of materials for the transparent conductive film include thin films of metal oxide such as tin oxide, indium oxide, antimony oxide, zinc oxide, cadmium oxide, or ITO, as well as a thin film of conductive polymer. In formation of the lower transparent electrode 11 or the upper transparent electrode 21, there is formed a conductive coating sheet on an entire surface of the protective panel body 10 or the transparent resin film 22 by vacuum vapor deposition, sputtering, ion plating, CVD, roll coating, or the like, and then unnecessary portions are removed by etching. In performing etching, after forming a resist onto the portion to be left as an electrode by photolithography, screening, or the like, the portions of the conductive coating sheet with no resist portions formed are removed by being dipped in or spraying an etching solution such as hydrochloric acid. Thereafter, the resist is removed by being dipped in a solvent so as to be swollen or dissolved. Alternatively, the conductive coating sheet can be etched with use of laser.

It is proper for the transparent resin cover film 24 to be transparent, regardless of colorless or colored. The protective panel 1 is allowed to have various designs in the decorative region by appropriate combination of the respective designs of the transparent cover film and the decorative layer. For example, in a case where the transparent resin cover film is formed to be transparent and colored and the decorative layer is configured by a metal layer with metallic luster, the decorative region of the protective panel 1 can be formed as a tint with colored metallic luster. Similarly to the transparent resin film 22, the transparent resin cover film 24 can be made of a resin film of an engineering plastic of polycarbonate series, polyamide series, polyether ketone series, or the like, or acrylic series, polyethylene terephthalate series, polybutylene terephthalate series, or the like.

The transparent resin cover film 24 is provided at least on one of the surfaces thereof with the decorative layer 23 that has the transparent window part. In a conventional protective panel, the decorative layer 23 with the transparent window part is provided on the lower surface of the protective panel body 10. However, in the protective panel according to the present invention, as already described, opaque circuit wirings are provided respectively on the upper surface of the protective panel body 10 and on the lower surface of the transparent resin film 11. Therefore, these opaque circuit wirings are covered and hidden by the decorative layer 23. The portion covered with the decorative layer 23 configures the decorative part 3 of the protective panel 1, while the remaining portion not covered with the decorative layer 23 configures the window part 2 of the protective panel 1.

The decorative layer 23 is generally formed as a printed layer on the front surface of the transparent resin cover film 24. The printed layer may be formed using a binder made of resin such as polyvinyl chloride series resin, polyamide series resin, polyester series resin, polyacrylic series resin, polyurethane series resin, polyvinyl acetal series resin, polyester urethane series resin, cellulosic ester series resin, or alkyd resin, as well as using a coloring ink containing pigment or dye in an appropriate color as a coloring agent. The printed layer may be formed by ordinary printing such as offset printing, gravure printing, or silk screening. In particular, offset lithography or gravure printing is suitable for multicolor printing or gradation expression. Upon monochrome printing, it is also possible to employ coating such as gravure coating, roll coating, or comma coating. The printed layer may be provided on the entire surface or may be partially provided in accordance with a desired decorative pattern.

The decorative layer 23 may be made of a metal thin film layer, or may be made by combination of a printed layer and a metal thin film layer. The metal thin film layer functions as a decorative layer 9 and provides expression of metallic luster. The metal thin film layer can be formed by vacuum vapor deposition, sputtering, ion plating, metal plating, or the like. In such a case, in accordance with the desired color of metallic luster, it is possible to use a metal such as aluminum, nickel, gold, platinum, chromium, iron, copper, tin, indium, silver, titanium, lead, or zinc, an alloy thereof, or a compound thereof. Usually, the metal thin film layer is partially provided. The metal thin film layer may be optionally provided together with a pre-anchor layer or a post-anchor layer in order to improve adhesiveness to a different layer.

The decorative layer 23 can be formed on either of the surfaces of the transparent resin cover film 24. As to be described later, in a case where the decorative layer 23 is formed on the lower surface of the transparent resin cover film 24 and is bonded in contact with the upper surface of the transparent resin film 3, the decorative layer 23 is not brought into direct contact with a finger or a pen. Thus, the decorative layer 23 can be prevented from abrasion. The upper surface of the transparent resin cover film may be applied with hard coating for improvement in abrasion resistance that is required to a touch panel.

The protective panel thus configured is provided with a touch input function on the entire surface of the protective panel body 10. Accordingly, no touch panel is required in the casing unlike the conventional product. Even in a case where the protective panel 1 is attached to the front surface of the front casing 50 of an electronic device such as a mobile phone as shown in FIG. 2B, the above feature realizes touch input operations in the display window of the electronic device.

Figure 4A:
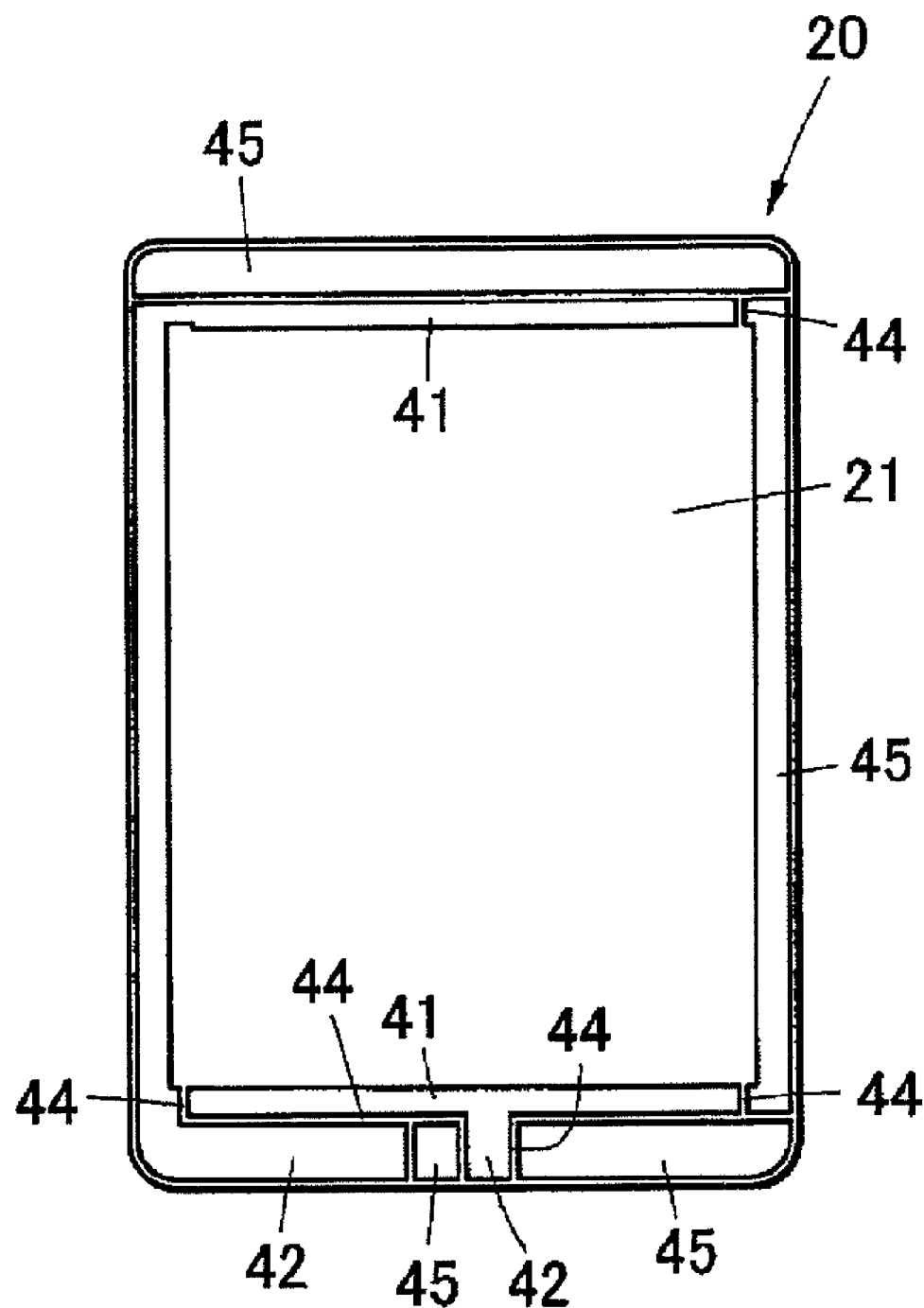
FIG. 4A is a schematic view showing an example of arrangement and configuration of an upper electrode that is provided on a rear surface of a movable electrode film of the protective panel having touch panel function as in FIG. 1.
Figure 4B:
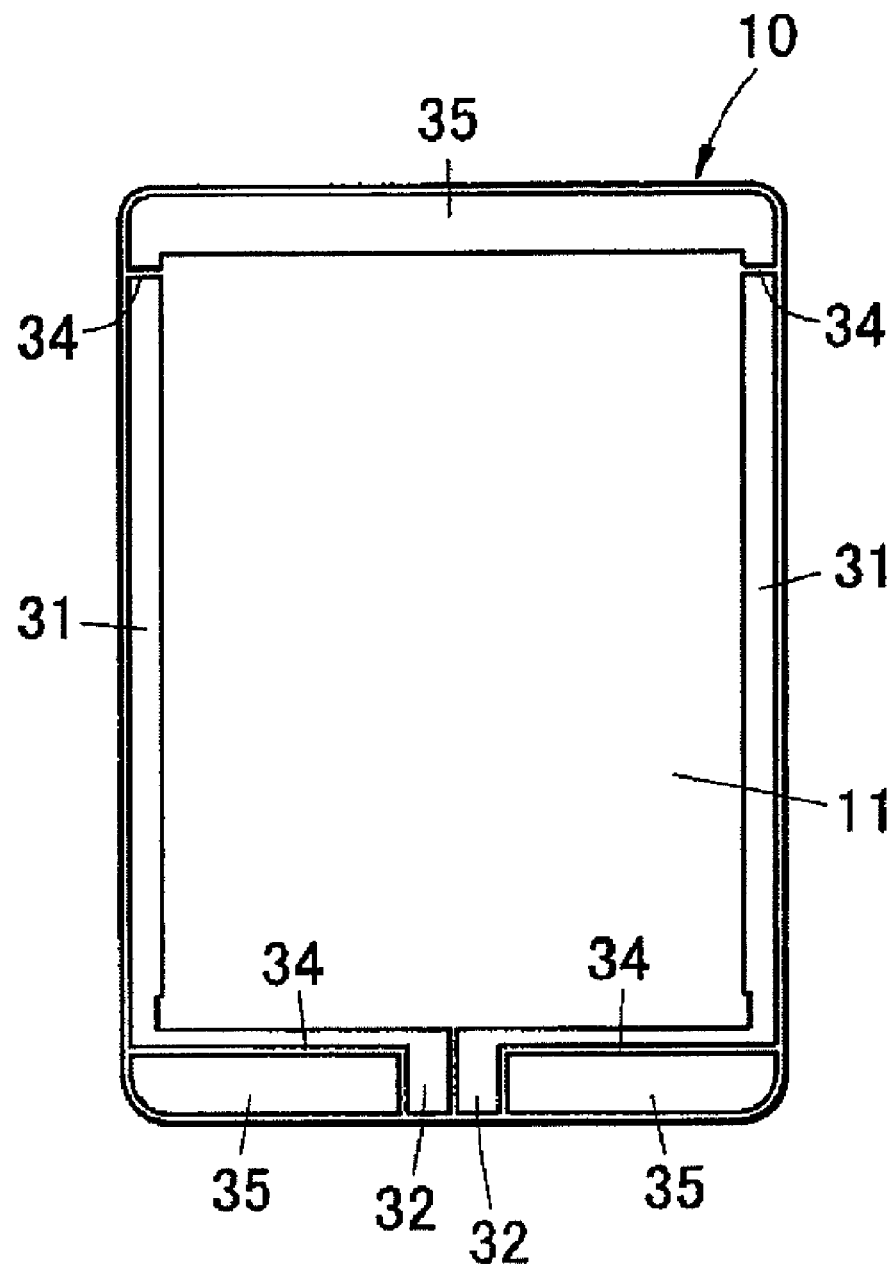
FIG. 4B is a schematic view showing an example of arrangement and configuration of a lower electrode that is provided on a front surface of the protective panel having a touch panel as in FIG. 1.

FIG. 4A is a schematic view showing an example of *arrangement and configuration of the upper electrode that is provided on the rear surface of the movable electrode film of the protective panel having touch panel function of in FIG. 1. FIG. 4B is a schematic view showing an example of arrangement and configuration of the lower electrode that is provided on the front surface of the protective panel having the touch panel as in FIG. 1.

Firstly described as an example is the movable electrode film 20 with reference to FIG. 4A. As described above, the movable electrode film 20 has such a construction that the upper transparent electrode 21 is provided on the front surface of the flexible transparent resin film 22. The transparent resin film 22 is provided on the front surface thereof with a pair of bus bars 41 and routing circuits 42. The pair of bus bars 41 are provided in parallel with each other respectively on upper and lower ends of the transparent electrode 21. The routing circuits 42 provide communication respectively from the bus bars 41 to the output terminals.

As materials for the bus bars 41 and the routing circuits 42 are used metals such as gold, silver, copper, or nickel, or conductive pastes of carbon or the like. The bus bars 41 and the routing circuits 42 are each formed by printing such as silk screening, offset printing, gravure printing, or flexography; by the photoresist technique; by brush coating; or the like.

There are provided height difference adjustment parts 45 on non-electrode parts where none of the upper transparent electrode 21, the bus bars 41, and the routing circuits 42 are placed on the front surface of the transparent resin film 22. The height difference adjustment parts 45 are spaced apart by minute gaps 44 from the upper transparent electrode 21, the bus bars 41, and the routing circuits 42 on the front surface of the transparent resin film 22 so as not to cause short circuit therewith. Each of the height difference adjustment parts 45 may be provided in any pattern as long as being configured to cause no short circuit with the electrodes provided on the movable electrode film 20 as well as the protective panel body 10 that are employed in the protective panel functioning as a touch panel.

The height difference adjustment parts 45 are each made of the material same as that for the bus bars 41 and the routing circuits 42, and have thickness substantially equal to each of those of the bus bars 41 and the routing circuits 42. The preferable thickness thereof is approximately not more than 10 μm. The height difference adjustment parts 45 thus provided evenly flatten the surface of the movable electrode film 20 when seen from the decorative layer, so that surface differences due to the bus bars and the routing circuits 42 become hard to be visually recognized.

The height difference adjustment parts 45 are preferably formed in the process of forming the bus bars 41 and the routing circuits 42. More specifically, in a case of forming the bus bars 41 and the routing circuits 42 by printing or the like, employed is a screen preliminarily configured to include the height difference adjustment parts 45 in the printing pattern thereof so as to print the height difference adjustment parts 45 simultaneously with the bus bars 41 and the routing circuits 42. When the height difference adjustment parts 45 are formed in the process of forming the bus bars 41 and the routing circuits 42, the thickness of the height difference adjustment parts 45 can be easily made equal to each of those of the bus bars 41 and the routing circuits 42 with no increase in the number of processes.

The height difference adjustment parts 45 are preferably provided to have an area corresponding to approximately from 70% to 95% of the non-electrode parts where none of the upper transparent electrode 21, the bus bars 41, and the routing circuits 42 are placed. The height difference adjustment parts 45 are preferably provided in a wide portion of the non-electrode parts for the purpose of reduction in surface difference. It is also required to provide the gaps 44 respectively between the height difference adjustment parts 45 and the bus bars 41 as well as between the height difference adjustment parts 45 and the routing circuits 42 in order to prevent short circuit with the bus bars 41 and the routing circuits 42.

It is preferable that each of the gaps between the height difference adjustment parts 45 and the electrodes is not covered with any adhesive layer (which is not limited to the double-sided adhesive tape 26 but may be printed). When the adhesive layer is provided so as not to cover the gaps between the height difference adjustment parts 45 and the electrodes, the front surface of the movable electrode film 20 is prevented from being concaved.

In order to prevent short circuit with the electrode part of the protective panel body 10, a resist material such as a resin may be applied to the region provided with the bus bars 41, the routing circuits 42, and the height difference adjustment parts 45.

Described next is the protective panel body 10 with reference to FIG. 4B. As described above, the protective panel body 10 is provided with the lower transparent electrode 11 on the front surface thereof. There are further provided on the front surface of the protective panel body 10 a pair of bus bars 31 and routing circuits 32. The pair of bus bars 31 are provided in parallel with each other respectively on right and left ends of the lower transparent electrode 11. The routing circuits 32 provide communication respectively from the bus bars 31 to the output terminals.

As materials for each of the bus bars 31 and the routing circuits 32 are used metals such as gold, silver, copper, or nickel, or conductive pastes of carbon or the like. The bus bars 31 and the routing circuits 32 are each formed by printing such as silk screening, offset printing, gravure printing, or flexography; by the photoresist technique; by brush coating; or the like.

There are provided height difference adjustment parts 35 on non-electrode parts where none of the lower transparent electrode 11, the bus bars 31, and the routing circuits 32 are placed on the front surface of the protective panel body 10. The height difference adjustment parts 35 are spaced apart by minute gaps 34 from the lower transparent electrode 11, the bus bars 31, and the routing circuits 32 on the front surface of the protective panel body 10 so as not to cause short circuit therewith. The height difference adjustment parts 35 are made of the material same as those for the bus bars 31 and the routing circuits 32, and have a thickness substantially equal to each of those of the bus bars 31 and the routing circuits 32.

There is provided the protective panel having touch panel function as described above when the movable electrode film 20 shown in FIG. 4A is combined with the protective panel body 10 shown in FIG. 4B. In this case, there are provided on the front surface of the transparent electrode film 22 configuring the movable electrode film 20 the height difference adjustment parts 45 that are constructed similarly to the bus bars 41 and the routing circuits 42. Accordingly reduced are the surface differences due to the electrodes. Therefore, the differences in height are hard to be visually recognized from the front surface of the protective panel even when the transparent electrode film 22 and the transparent resin cover film 24 are bonded to each other.

According to FIG. 4B, the protective panel body 10 is also provided with the height difference adjustment parts 35. However, these height difference adjustment parts 35 may not be necessarily provided on the protective panel body 10. This is because these height difference adjustment parts are provided to reduce the surface differences visually recognized from the front surface of the movable electrode film 20. The differences in height of the protective panel body 10 affect to some extent also to the movable electrode film 20 through the adhesive layer 26. Then, when there are provided the height difference adjustment parts on both of the protective panel body 10 and the movable electrode film 20, the movable electrode film may not be affected by the differences in height on the both of the protective panel body 10 and the movable electrode film 20, thereby resulting in improvement in appearance of the front surface.

Figure 5A:
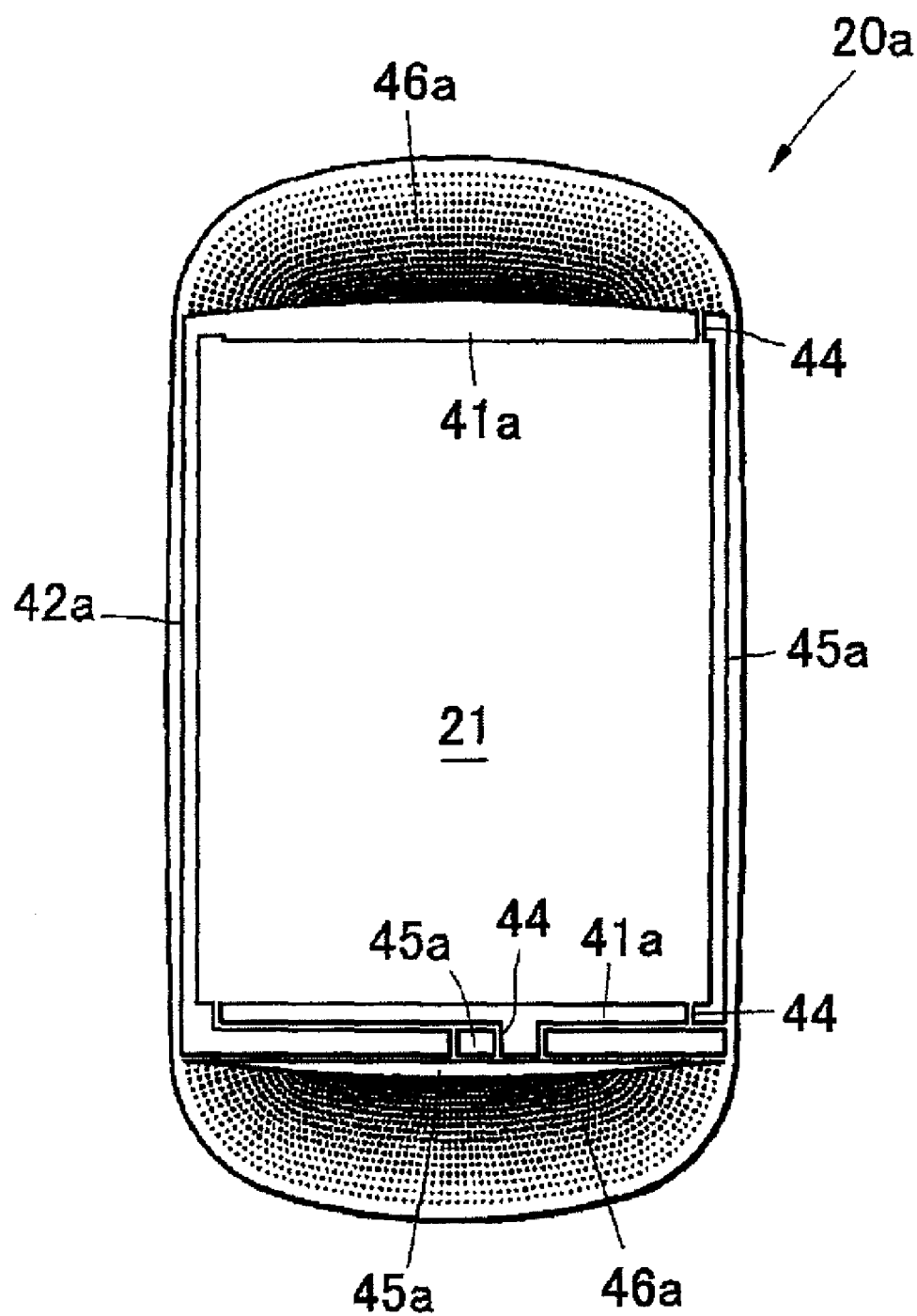
FIG. 5A is a schematic view showing an example of arrangement and configuration of an upper electrode that is provided on a rear surface of a movable electrode film of a protective panel having touch panel function according to another embodiment of the present invention.
Figure 5B:
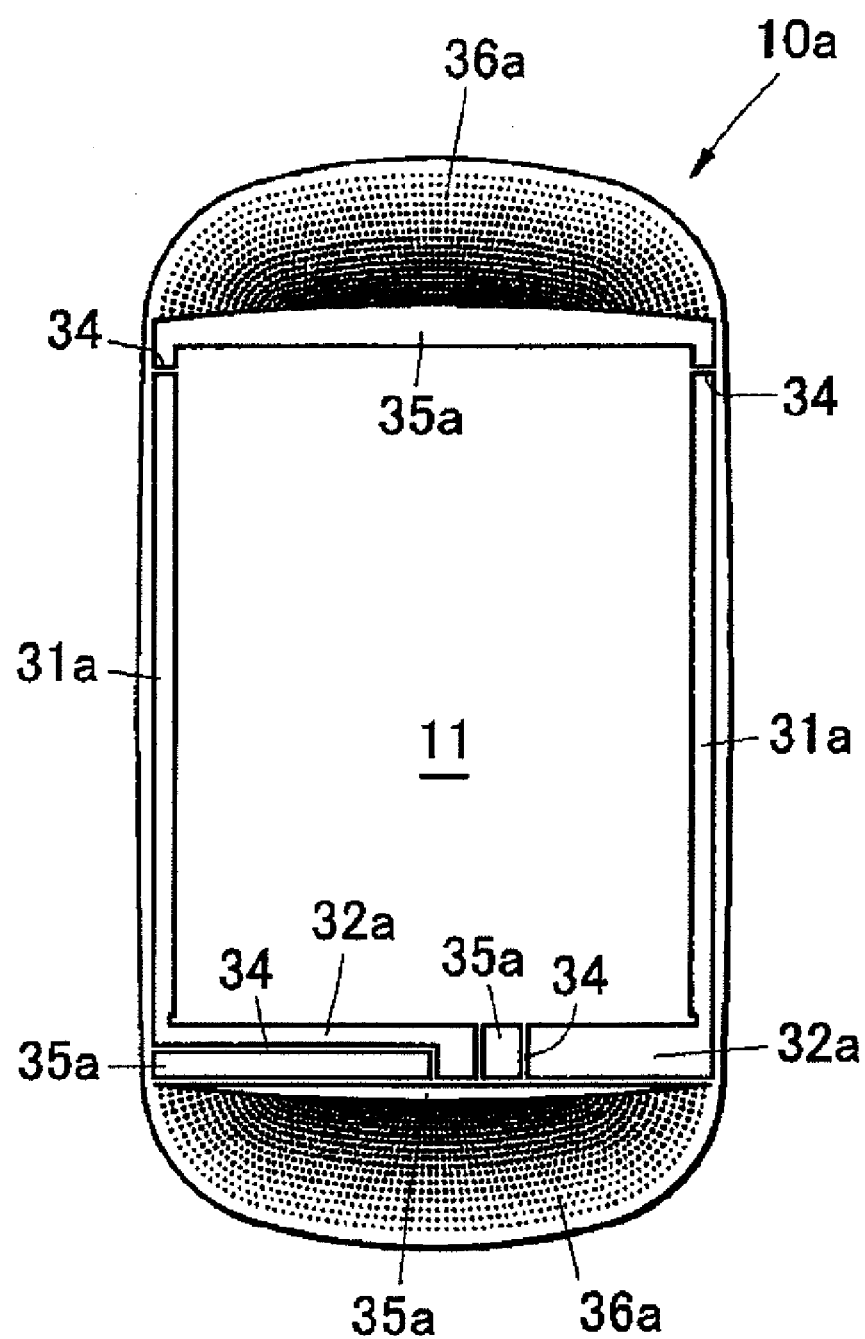
FIG. 5B is a schematic view showing an example of arrangement and configuration of a lower electrode that is provided on a front surface of the protective panel having a touch panel according to the other embodiment of the present invention.
Figure 6A:
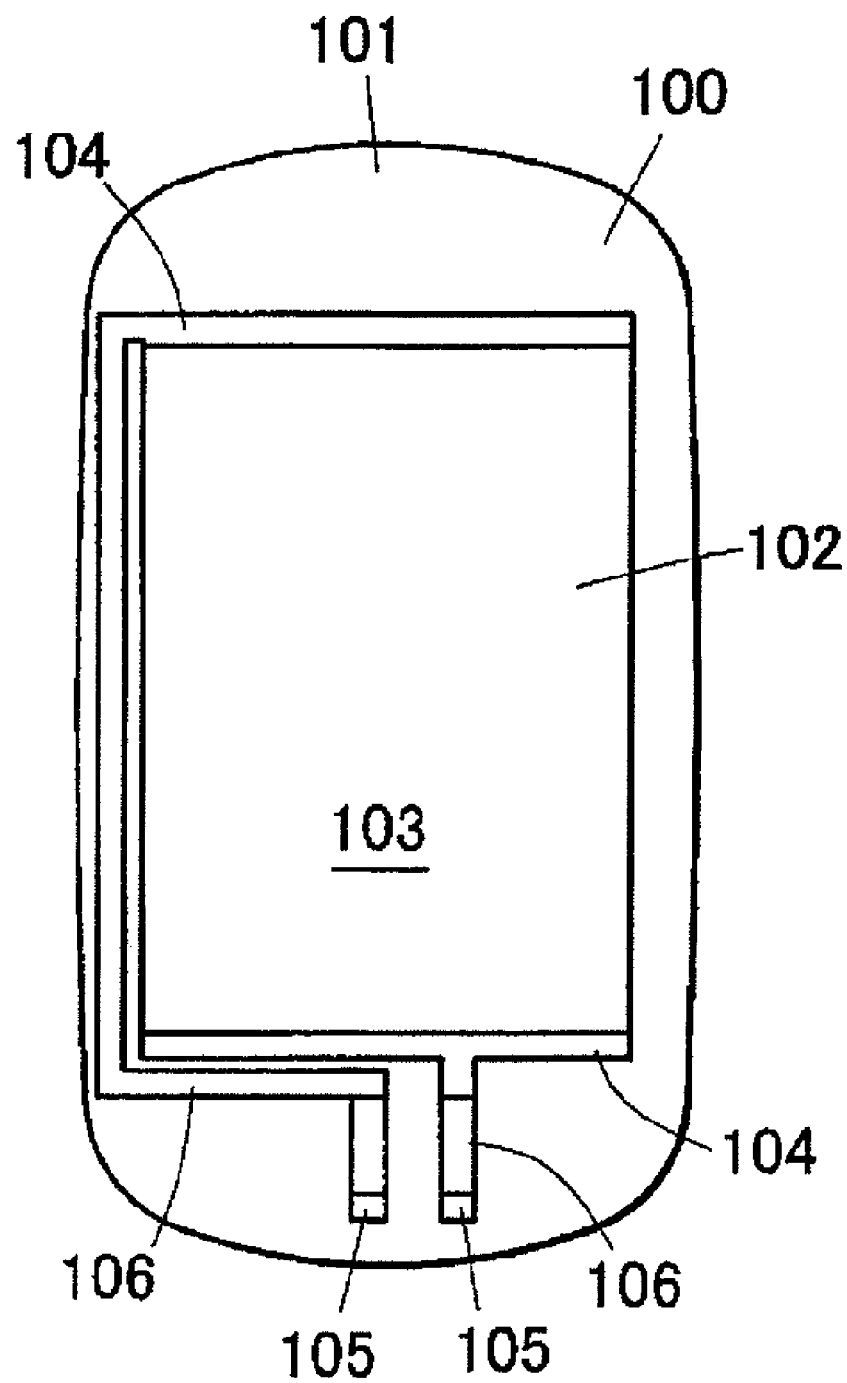
FIG. 6A is a schematic view showing an example of arrangement and configuration of an upper electrode that is provided on a rear surface of an upper electrode sheet in a conventional protective panel having a touch panel.
Figure 6B:
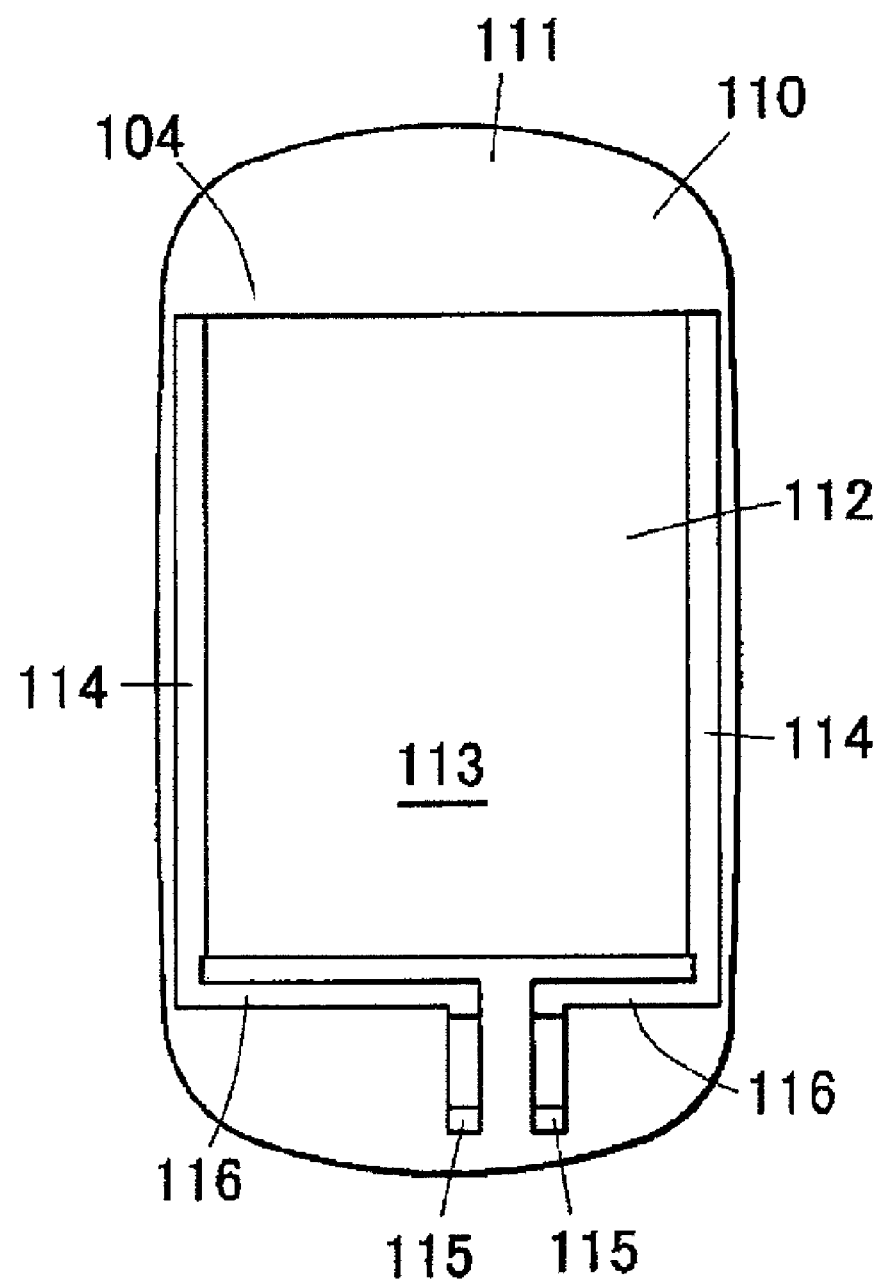
FIG. 6B is a schematic view showing an example of arrangement and configuration of a lower electrode that is provided on a front surface of a lower electrode sheet in the conventional protective panel having a touch panel.

FIG. 5A is a schematic view showing an example of arrangement and configuration of an upper electrode that is provided on a rear surface of a movable electrode film of a protective panel having touch panel function according to another embodiment of the present invention. FIG. 5B is a schematic view showing an example of arrangement and configuration of a lower electrode that is provided on a front surface of the protective panel functioning as a touch panel according to the other embodiment of the present invention.

According to the embodiment shown in FIGS. 5A and 5B, in comparison with the protective panel shown in FIGS. 4A and 4B, there is found a difference in disposition pattern of the height difference adjustment parts provided on each of surfaces of a movable electrode film 20a and a protective panel body 10a. More specifically, the movable electrode film 20a and the protective panel body 10a according to the present embodiment each have non-electrode parts of a larger area. Then, as provision of the height difference adjustment parts on the entire non-electrode parts increases the cost for production, the height difference adjustment parts are formed in dot shapes that are distributed to be gradually sparser toward the edges.

More specifically, the movable electrode film 20a is exemplarily described with reference to FIG. 5A. As described above, the movable electrode film 20a has such a construction that the upper transparent electrode 21 is provided on the front surface of the flexible transparent resin film 22. The transparent resin film 22 is provided on the front surface thereof with a pair of bus bars 41a and routing circuits 42a. The pair of bus bars 41a are provided in parallel with each other respectively on the upper and lower ends of the transparent electrode 21. The routing circuits 42a provide communication respectively from the bus bars 41a to the output terminals.

There are provided height difference adjustment parts 45a and 46a on non-electrode parts where none of the upper transparent electrode 21, the bus bars 41a, and the routing circuits 42a are placed on the front surface of the transparent resin film 22. The height difference adjustment parts 45a and 46a are spaced apart by the minute gaps 44 from the upper transparent electrode 21, the bus bars 41a, and the routing circuits 42a on the front surface of the transparent resin film 22a so as not to cause short circuit therewith. The height difference adjustment parts 45a are placed in the vicinity of the bus bars 41a and the routing circuits 42a, and are each provided as a solid pattern in the present embodiment. The height difference adjustment parts 46a are respectively provided as layers that are placed closer to the edges relative to the height difference adjustment parts 45a, and are each provided as a dot matrix pattern. In each of the height difference adjustment parts 46a, the dots are distributed to be gradually sparser toward the edge.

As shown in FIG. 5B, also on the protective panel body 10a, there are provided height difference adjustment parts 35a and 36a on non-electrode parts where none of the lower transparent electrode 11, bus bars 31a, and routing circuits 32a are placed. The height difference adjustment parts 35a and 36a are spaced apart by the minute gaps 34 from the upper transparent electrode 11, the bus bars 31a, and the routing circuits 32a on the front surface of the protective panel body 10a so as not to cause short circuit therewith. The height difference adjustment parts 35a are placed in the vicinity of the bus bars 31a and the routing circuits 32a, and are each provided as a solid pattern in the present embodiment. The height difference adjustment parts 36a are provided as layers that are placed closer to the edges relative to the height difference adjustment parts 35a, and are each provided as a dot matrix pattern. In each of the height difference adjustment parts 36a, the dots are distributed to be gradually sparser toward the edge.

Provision of the height difference adjustment parts thus configured realizes reduction in wirings that will need the relatively expensive silver material or the like in a protective panel having large non-electrode parts, thereby resulting in reduction in cost for production. Moreover, the height difference adjustment parts are provided to be gradationally sparser toward the edges of the protective panel. Accordingly improved are flatness as well as visual appearance when seen from the front surface of the protective panel, and the surface differences formed on the transparent resin film become hard to be visually recognized.

WORKING EXAMPLE 1

There was fabricated a decorative sheet with metallic luster by applying gravure printing as well as aluminum vapor deposition to a polyethylene terephthalate (hereinafter, referred to as PET) sheet of 38 μm thick. A PET sheet of 125 μm thick with a hard coating layer provided on the front surface thereof was bonded using a baseless transparent adhesive sheet of 25 μm thick to the decorative sheet on the surface not provided with a decorative layer, and there was thus obtained a movable electrode film provided with the hard coating layer. Then bonded to the movable electrode film was a PET sheet of 25 μm thick with a transparent conductive layer. Upon application of a silver material for the purpose of formation of bus bars and circuits, 90% of non-electrode parts was applied with the silver material so as to form a film of 7 μm thick. Moreover, the entire wiring regions except a part to lead out terminals were overcoated with a resist material. In this way, there was fabricated the movable electrode film.

A protective panel body was fabricated by bonding a polycarbonate (hereinafter, referred to as PC) sheet of 100 μm thick with a transparent conductive layer to a PC sheet of 1 mm thick as a support plate, with use of a baseless transparent adhesive sheet of 25 μm thick.

The protective panel body and the movable electrode film were bonded to each other only at the wiring regions with use of a double-sided adhesive tape so as to obtain a protective panel having touch panel function. This protective panel had excellent appearance with no visual recognition of underneath surface differences on the decorative layer.

WORKING EXAMPLE 2

There was fabricated a decorative sheet with metallic luster by applying gravure printing as well as aluminum vapor deposition to a PET sheet of 38 μm thick. A PET sheet of 125 μm thick with a hard coating layer provided on the front surface thereof was bonded using a baseless transparent adhesive sheet of 25 μm thick to the decorative sheet on the surface not provided with a decorative layer, and there was thus obtained a movable electrode film provided with the hard coating layer. Then bonded to the movable electrode film was a PET sheet of 25 μm thick with a transparent conductive layer. Upon application of a silver material for the purpose of formation of bus bars and circuits, non-electrode parts were applied with the silver material to form a film of 7 μm thick in a dot matrix pattern so as to get gradationally sparser toward the edges. Moreover, the entire wiring regions except a part to lead out terminals were overcoated with a resist material. In this way, there was fabricated the movable electrode film.

A protective panel body was fabricated by bonding a polycarbonate (hereinafter, referred to as PC) sheet of 100 μm thick with a transparent conductive layer to a PC sheet of 1 mm thick as a support plate, with use of a baseless transparent adhesive sheet of 25 μm thick.

The protective panel body and the movable electrode film were bonded to each other only at the wiring regions with use of a double-sided adhesive tape so as to obtain a protective panel having touch panel function. This protective panel had excellent appearance with no visual recognition of underneath surface differences on the decorative layer.

WORKING EXAMPLE 3

There was fabricated a decorative sheet with metallic luster by applying gravure printing as well as aluminum vapor deposition to a PET sheet of 38 μm thick. A PET sheet of 125 μm thick with a hard coating layer provided on the front surface thereof was bonded using a baseless transparent adhesive sheet of 25 μm thick to the decorative sheet on the surface not provided with a decorative layer, and there was thus obtained a movable electrode film provided with the hard coating layer. Then bonded to the movable electrode film was a PET sheet of 25 μm thick with a transparent conductive layer. Upon application of a silver material for the purpose of formation of bus bars and circuits, approximately 90% of non-electrode parts was applied with the silver material to form a film of 7 μm thick. Moreover, the entire wiring regions except a part to lead out terminals were overcoated with a resist material. Further, a glue material was applied to the wiring regions except the part to lead out the terminals so as to obtain an adhesive sheet. In this case, the glue material was not applied to the part applied with the silver material. In this way, there was fabricated the movable electrode film.

A protective panel body was fabricated by bonding a polycarbonate (hereinafter, referred to as PC) sheet of 100 μm thick with a transparent conductive layer to a PC sheet of 1 mm thick as a support plate, with use of a baseless transparent adhesive sheet of 25 μm thick.

The protective panel body and the movable electrode film were bonded to each other only at the wiring regions with use of a double-sided adhesive tape so as to obtain a protective panel having touch panel function. This protective panel had excellent appearance with no visual recognition of underneath surface differences on the decorative layer.

As described above, in the protective panel according to the present embodiment, the non-electrode regions of the movable electrode film are provided with the height difference adjustment parts that are fabricated simultaneously with provision of the wirings, so that the underneath surface differences can be hard to be visually recognized from the front surface. Particularly in a case where the decorative layer of the movable electrode film has metallic luster, the surface differences tend to stand out due to reflection of light and the like. However, according to the above embodiment, the surface differences can be hard to be visually recognized even in such a case.

It is noted that the present invention is not limited to the embodiments described above, but can be embodied in other various aspects. For example, in the above embodiments, as the height difference adjustment parts are made of the conductive material same as that for the routing circuits and the bus bars, there are provided the gaps thereamong. Alternatively, in such a case where the height difference adjustment parts themselves are made of a nonconductive material, there is no need to provide the gaps between the height difference adjustment parts and the routing circuits as well as between the height difference adjustment parts and the bus bars. In this case, interfaces between the height difference adjustment parts and the routing circuits as well as between the height difference adjustment parts and the bus bars function as nonconductive parts so as to prevent short circuit with the routing circuits and the bus bars.

By properly combining the arbitrary embodiments of the aforementioned various embodiments, the effects possessed by the embodiments can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A protective panel having touch panel function, the protective panel being used for protecting a front surface of a display device that is disposed so as to be visually recognized from outside, and the protective panel being fitted in a panel fitting part of a casing provided with an opening such that an outer surface of the protective panel forms a flat plane identical with that of the casing with no gap formed therebetween, the protective panel comprising: a flexible upper electrode sheet having an upper electrode provided on a lower surface thereof and a decorative layer provided to hide the upper electrode; and a lower electrode sheet having a lower electrode provided on an upper surface thereof, the upper electrode sheet and the lower electrode sheet being disposed such that the respective electrodes thereof face with each other, the protective panel comprising, on the lower surface of the upper electrode sheet, at a non-electrode part not provided with the upper electrode, a height difference adjustment part having a thickness substantially equal to that of the upper electrode, with a nonconductive part interposed between the height difference adjustment part and each of the upper electrode and the lower electrode so as to prevent short circuit therebetween.

2. The protective panel having touch panel function according to claim 1, wherein the upper electrode comprises a pair of bus bars, and routing circuits that provide communication respectively from the bus bars to output terminals, and the height difference adjustment part is made of a material same as that for the bus bars and the routing circuits of the upper electrode.

3. The protective panel having touch panel function according to claim 1, wherein the height difference adjustment part is provided as a solid pattern to cover the non-electrode part on the lower surface.

4. The protective panel having touch panel function according to claim 1, wherein the height difference adjustment part is provided as a pattern of dots that are distributed to be gradually sparser toward an edge of the protective panel.

5. The protective panel having touch panel function according to claim 1, wherein the decorative layer has metallic luster.

6. The protective panel having touch panel function according to claim 1, wherein the height difference adjustment part is provided in 70 to 95% of an area of the non-electrode part.

7. The protective panel having touch panel function according to claim 1, wherein the upper electrode sheet and the lower electrode sheet are bonded to each other using an adhesive layer that is provided on peripheries thereof, and the adhesive layer is provided at a portion provided with the height difference adjustment part.

8. The protective panel having touch panel function according to claim 1, wherein the upper electrode comprises a pair of bus bars, and routing circuits that provide communication respectively from the bus bars to output terminals, and the height difference adjustment part and the bus bars and the routing circuits of the upper electrode are configured by metal layers that are formed on the upper electrode sheet simultaneously with each other in a print process.

9. The protective panel having touch panel function according to claim 1, wherein the nonconductive part is provided as an air space between the upper electrode and the height difference adjustment part that are spaced apart from each other.

10. The protective panel having touch panel function according to claim 9, wherein the adhesive layer is provided so as not to be in contact with the air space.

11. The protective panel having touch panel function according to claim 1, wherein the nonconductive part is provided as a resist layer on a front surface between the upper electrode and the height difference adjustment part.

12. The protective panel having touch panel function according to claim 1, further comprising on the upper surface of the lower electrode sheet, at a non-electrode part not provided the lower electrode, a lower height difference adjustment part having a thickness substantially equal to that of the lower electrode, with a nonconductive part interposed between the lower height difference adjustment part and each of the upper electrode and the lower electrode so as to prevent short circuit therebetween.

* * * * *